United States Patent Office 3,327,517
Patented June 27, 1967

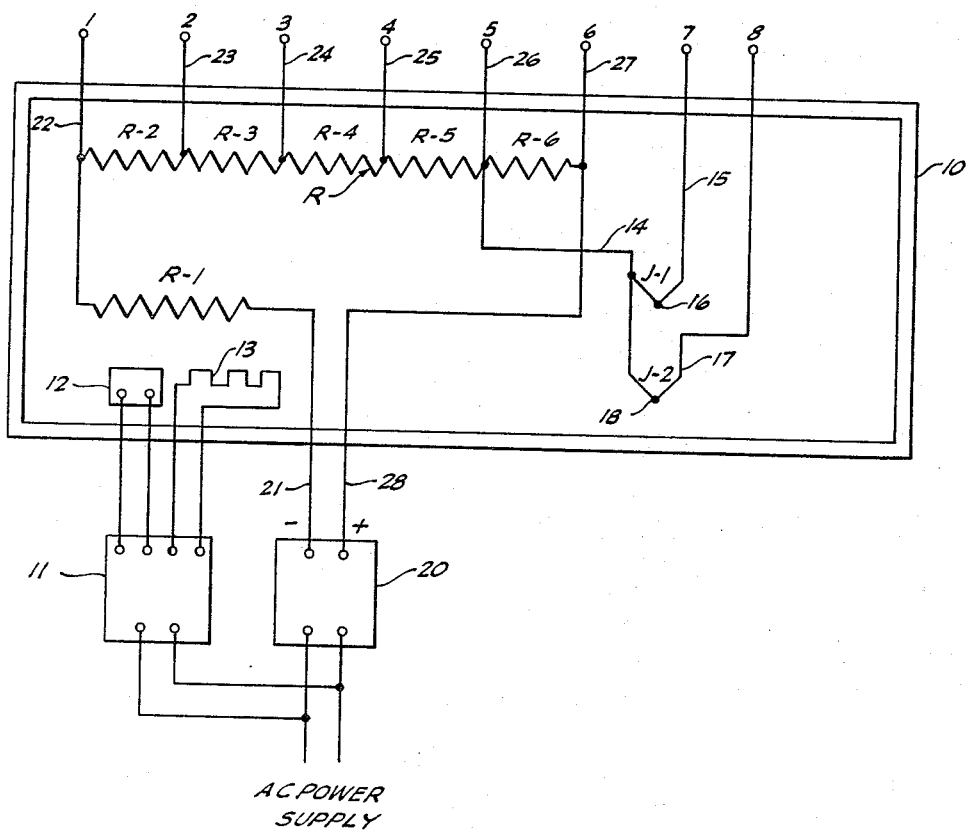

3,327,517
PRECISE THERMOCOUPLE REFERENCE FOR INSTRUMENT CALIBRATION
Joseph G. Huffman, Brea, Calif., assignor to Union Oil Company of California, Los Angeles, Calif., a corporation of California
Filed Dec. 1, 1964, Ser. No. 414,997
6 Claims. (Cl. 73—1)

This invention relates to a device for calibrating instruments for measuring the electric potential generated by a thermocouple, and more particularly concerns a device for generating a plurality of different constant reference potentials suitable for the calibration of thermocouple actuated potentiometer and millivoltmeter temperature measuring instruments.

As is well known, thermocouples comprising two dissimilar metal conductors joined together at one end are widely employed in the measurement of temperature. In a typical application, the temperature-sensing thermocouple (termed a "hot junction") is positioned at the point of temperature measurement and is connected by suitable insulated leads to a null-balance potentiometer, or where less accuracy is required, to a millivoltmeter. Since the thermocouple leads are connected together through the internal circuitry of the potential measuring instrument, a second thermocouple junction (termed a "cold junction") is inherently formed within the instrument even though the two dissimilar conductors are not directly connected together. An electric potential will be generated by both of these thermocouples, the measured potential being the algebraic sum of the hot and cold junction potentials. The potential measuring instrument can be calibrated to indicate the measured temperature directly in degrees Fahrenheit or centigrade by maintaining the cold junction at a known reference temperature, or by compensation to cancel the potential generated by the cold junction thermocouple, thus causing the instrument to indicate the true temperature of the hot junction.

Potentiometer and millivoltmeter temperature measuring instruments can be calibrated to determine their accuracy by substituting a known precise potential for the potential generated by the hot junction. This impressed precise potential will correspond to a specific temperature, the exact value of which depends on the metals employed as thermocouple conductors. The aforementioned calibration method is rendered difficult by the fact that a thermocouple junction is inherently created when the source of the calibration potential is connected to the instrument being calibrated, some form of compensation being required to correct for the effect of the potential generated by this junction. In calibrating the instrument to read the true hot junction temperature, it is necessary to maintain the junction formed by the connection of the calibration device at the reference temperature, to apply a computed correction based on the measured junction temperature, or to employ supplemental temperature-responsive means to compensate for the potential developed at the junction. Such procedures are not satisfactory from the standpoints of accuracy, speed and convenience, nor are they adapted for convenient use under field conditions.

It is accordingly an object of the present invention to provide a device for the calibration of potentiometers and millivoltmeters which are employed with thermocouples for measuring temperatures. A further object is to provide a source of precise reference potentials for calibrating such instruments which do not require compensation for the potential developed by the thermocouple junction formed by the connection of the potential source to the instrument being calibrated. A still further object is to provide a simple, rugged, portable instrument for calibrating thermocouple actuated temperature measuring instruments. Other and related objects of the invention will be apparent from the following detailed description.

I have found that the foregoing objects and their attendant advantages can be realized by maintaining a reference thermocouple at a predetermined fixed temperature, thereby generating a known electric potential and, by means of appropriate voltage dividing circuitry, increasing and/or decreasing this potential to obtain a plurality of precise reference potentials covering the range of potentials normally encountered in temperature measurement. The essential elements of my invention therefore comprise a reference thermocouple and a voltage divider positioned within a housing forming an enclosed chamber which can be maintained at a constant temperature. One leg of the reference thermocouple is connected to the voltage divider to which is also applied a fixed potential. The voltage drops developed by the voltage divider are algebraically added to the potential developed by the reference thermocouple to obtain a series of potentials which may be either higher or lower than the potential developed by the thermocouple. The voltage divider and connecting conductors are constructed of the same metal as the thermocouple leg to which they are connected so as to avoid establishing undesired thermocouple junctions within the device itself. As is hereinafter more fully explained, two or more reference thermocouples can be included in the same apparatus, thereby increasing the flexibility of the device.

My invention may be more readily understood by reference to the accompanying drawing which is a circuit diagram illustrating one embodiment of the invention in which two reference thermocouples are employed. The reference thermocouple junctions J–1 and J–2 and voltage divider R are shown enclosed in constant temperature oven 10 which comprises an enclosed insulated container internally provided with an electric heating element 13. Oven 10 may be a standard constant temperature components oven, such as that employed in maintaining piezo-electric crystals at a constant temperature. The temperature at which oven 10 is operated is not critical so long as a known constant temperature is maintained. Normally, a temperature between about 40° C. and about 90° C., and preferably between about 50° C. and about 70° C., is satisfactory for most applications, although higher temperatures can be employed if desired. However, since any deviation from the predetermined temperature will result in a change in the potential generated by the reference thermocouples, it is necessary that the oven temperature be controlled to within less than ±0.5° C. of the predetermined temperature, and preferably to within less than ±0.1° C. thereof, in order that the accuracy required for most calibration purposes be obtained. This control is achieved by means of thermostat 11 located external to the oven and actuated by temperature sensing element 12 located within the oven and suitably taking the form of a mercury thermometer, or other means of accurate temperature detection. Heating element 13 is energized and deenergized by thermostat 11 to maintain the precise temperature required for calibration accuracy. Power for heating element 13 may be supplied from an external source such as the alternating current source illustrated, or from a direct current source, such as a battery supply. Battery power is preferred where the device is to be portable.

The reference thermocouple of my device must be formed of the same metals or metal alloys as the thermocouple actuating the instrument to be calibrated. Although thermoelectric phenomenon is evidenced when a thermocouple is formed of any two dissimilar metal conductors, certain metal and metal alloy combinations have been found particularly suitable for temperature measurement. Common metal and metal alloy combinations preferred for thermocouple conductors, and of which the reference thermocouples of my apparatus can be constructed, include iron and constantan (a 60% Cu, 40% Ni alloy), copper and constantan, Chromel (a 90% Ni, 10% Cr alloy) and constantan, platinum and platinum-rhodium (a 90% Pt–10% Rh alloy), and Chromel and Alumel (a 94% Ni, 2% Al, 3% Mn, 1% Si alloy). In any case, the reference thermocouples must be formed of two dissimilar conductors of the same metals or metal alloys as the thermocouple actuating the instrument to be calibrated, as must be the thermocouple lead wires connecting the calibration device and the temperature instrument to be calibrated.

To avoid having a separate calibration apparatus for each type of thermocouple encountered, it is often desirable to incorporate two or more reference thermocouples of different metals within a single calibration device. Where these reference thermocouples each have a common metal, a single voltage dividing circuit can be employed and the voltage divider and connectors can be constructed of the common metal, thereby avoiding the creation of undesired dissimilar metal junctions. Otherwise, where no common metal exists, a separate voltage divider must be employed with each reference thermocouple. For example, J–1 can be an iron-constantan thermocouple and J–2 can be copper-constantan, in which case a single voltage divider R, fabricated of constantan, can be employed. Such a device is adapted to the calibration of potential measuring instruments with reference to either iron-constantan or copper-constantan thermocouples.

Referring again to the drawing, conductor 14 and conductor 15 are fabricated of different metals, preferably selected from one of the aforesaid metal combinations, and connected together at 16 by welding or other positive means of connection to form thermocouple J–1. Conductor 15 extends outside of oven 10, terminating at terminal 7. Similarly, conductor 17 is fabricated of a third metal and connected to conductor 14 at 18 by similar connection means to form thermocouple J–2. Conductor 17 extends outside of oven 10, terminating at terminal 8.

The voltage divider can comprise a single resistor, a series of resistors, or a tapped resistor, the number and resistance thereof depending on the number and magnitude of precise potentials desired. Voltage divider R is shown taking the form of a tapped resistor comprising resistor sections R–2, R–3, R–4, R–5 and R–6 connected in series. Leads 22 and 27 connect the opposite ends of the tapped resistor to terminals 1 and 6, respectively, located outside oven 10, and taps 23, 24, 25 and 26 located at predetermined intermediate points along the electrical length of resistor R, are connected to terminals 2, 3, 4, and 5, respectively, similarly located outside oven 10.

Power supply unit 20 is connected across voltage divider R by means of leads 21 and 28, and constitutes a source of regulated direct current at low voltage. The capacity of power supply unit 20 is not critical so long as the overall circuit is appropriately designed, and so long as relatively precise regulation is maintained. Although either voltage or current regulation may be employed, current regulation is usually preferred. In oder to obtain satisfactory accuracy, the regulation should be less than .01% for a 10% input change, and preferably less than .002% for such change. The output will normally be less than about 10 milliamps at less than about 10 volts, typically 1 milliamp at 1 volt. Power supply unit 20 may comprise a rectifier operating on alternating current, as illustrated, or it may comprise a direct current source, such as a battery.

Resistor R–1 is placed in the circuit to achieve the correct overall current flow to impress a predetermined fixed potential across voltage divider R, particularly with voltage regulated direct current supply units. Where current regulated units are employed, the additional resistance may be unnecessary, and resistor R–1 may be deleted. In either case, the total resistance of the voltage dividing circuit, neglecting loss in the various conductors, is the sum of the resistances of the resistor sections in the circuit, in the illustrated case being R–2, R–3, R–4, R–5, and R–6. Resistor sections R–2 through R–6 are sized to produce desired voltage drops spanning the calibration range when algebraically added to the reference thermocouple potential, as will be more fully explained.

One leg of the reference thermocouple is connected to the voltage divider circuit, preferably at an intermediate point along the electrical length of the voltage divider. Where a plurality of reference thermocouples are combined with a single voltage divider, the thermocouples can be connected at the same, or different, points. In the illustrated device, conductor 14 forms one leg of both thermocouples J–1 and J–2, and is connected to voltage divider at an intermediate point between resistance sections R–5 and R–6. For the reason previously stated, conductor 14, tapped resistor R, leads 22, 23, 24, 25, 26 and 27, and terminals 1, 2, 3, 4, 5, and 6 must be fabricated of the same metal. Since the thermocouple lead wire connected to one of the aforesaid terminals will also be formed of this metal, no additional dissimilar metal junction is introduced into the circuit.

The precise reference potentials generated by my device are developed by algebraically adding constant voltage drops of known magnitude to the constant potential generated by the reference thermocouple. Referring again to the drawing, the potential generated by reference thermocouple J–1 appears across terminals 5 and 7. Simultaneously, a regulated direct current flows from the negative terminal of the power supply unit 20 through resistor R–1 and the voltage dividing circuit to the positive terminal of the power supply. Since a constant current is flowing through resistance sections R–2 through R–6, a constant voltage drop will appear across each of the resistance sections, the magnitude of each voltage drop depending on the resistance of the particular section.

Thus, the electric potential between terminal 7 and any of terminals 1 through 6 will be the algebraic sum of the potential generated by the reference thermocouple J–1 and the particular resistance sections in the circuit. For example, the potential between terminal 4 and terminal 7 is equivalent to the potential generated by thermocouple J–1 plus the voltage drop across resistance section R–5, and the potential between terminal 7 and terminal 3 is the potential generated by thermocouple J–1 plus the voltage drops across resistance sections R–5 and R–4. Similarly, the potential across terminals 1 and 8 will be the potential developed by reference thermocouple J–2 plus the voltage drop across resistance sections R–5, R–4, R–3 and R–2.

By connecting the reference thermocouple at an intermediate point of the voltage divider, a series of potentials either above or below that generated by the thermocouple may be developed. In this manner the calibration range can be extended to temperatures above and below that maintained in the constant temperature oven. For example, the potential between terminals 7 and 6 will be the difference between the potential developed by thermocouple J–1 and the voltage drop across resistance section R–6, and will be representative of a temperature below that of the oven. As will be apparent, any desired number of calibration potentials may be obtained by providing a corresponding number of taps on voltage divider R. Usually at least four are provided in order to satisfactorily cover the range of the potentiometer being calibrated, although the device is fully operable with a single risistor having a single tap located at any predetermined point along the electrical length of the resistor.

In calibrating a thermocouple actuated temperature measuring instrument with the present device, the instrument is connected across a reference thermocouple of the apparatus having the same conductor metals as the actuating thermocouple, the connection being made to terminals having a potential corresponding to a temperature within the instrument range by means of thermocouple lead wires of the same metals as the thermocouples. For example, one thermocouple lead wire is appropriately connected to terminal 7 or 8, and the other lead wire to one of the terminals 1 through 6, depending on the calibration temperature desired. In the event the temperature indicated by the temperature measuring instrument does not correspond to the known reference temperature, appropriate adjustment of the instrument may be made. The connection is then shifted to another of the terminals 1 through 6 and the instrument again adjusted to indicate this different reference temperature. This procedure can be repeated until the instrument has been adjusted to give correct temperature readings over its entire range.

The component parts of my device may be arranged on a suitable rack, frame, or other structure, or contained within a box or other small container. One preferred arrangement comprises a small enclosed box housing the oven, temperature regulator, power supply and other component parts. The operating controls and terminals can then be arranged on the upper face of the box for easy access. If desired, the top face may be protected by a hinged cover which can be closed when the apparatus is not in use.

Another modification which may be made to improve the convenience of use is to connect the resistor taps to a common external terminal and to include a switch in each of the resistor tap connectors. Thus, the two thermocouple lead wires can be connected to terminals on the calibrating device and the various potentials selected by merely operating appropriate switches. Alternatively, the potential selector can comprise a multiple terminal rotary selector switch, or similar device.

Although one particular embodiment of my device employing two thermocouples and a common voltage dividing circuit containing five voltage dividing resistance sections has been illustrated and particularly described, it is within the scope of my invention to employ a single reference thermocouple. Similarly, more than two such thermocouples may be combined with a single voltage dividing circuit, provided only that one conductor of each thermocouple and the voltage dividing circuit are composed of the same metal. The voltage dividing circuit may be comprised of any number of resistance sections, depending only on the number of different precise reference potentials desired. Also, two entirely different thermocouples, e.g. iron-constantan and platinum-platinum/rhodium, may be mounted in the same oven, provided only that separate voltage dividers are employed therewith. These and other modifications will be apparent to one skilled in the art without departing from the scope and spirit of my invention as defined by the following claims:

I claim:
1. A device for calibrating thermocouple potential measuring instruments comprising:
   a housing forming an enclosed chamber;
   means for maintaining a predetermined fixed temperature within said chamber;
   a thermocouple comprising first and second conductors formed of dissimilar metals positioned within said chamber;
   a resistor positioned within said chamber, said resistor being formed of the same metal as said first conductor and being connected to said first conductor;
   means for applying a fixed potential across said resistor; and
   means for making external electrical connections to at least one predetermined point along the electrical length of said resistor and to said second conductor.

2. A device as defined by claim 1 wherein said means for maintaining a fixed temperature within said chamber comprises an electric heater positioned therewithin and a thermostat means for controlling said heater, said thermostat being actuated by a temperature sensing device located within said chamber.

3. A device for calibrating thermocouple potential measuring instruments comprising:
   a housing forming an enclosed chamber;
   electric heating means positioned within said chamber and adapted to maintain a predetermined fixed temperature therewithin;
   a thermocouple comprising first and second conductors formed of dissimilar metals positioned within said chamber;
   a resistor positioned within said chamber and being provided with a plurality of taps at predetermined points along the electrical length of said resistor, said resistor and taps being formed of the same metal as said first conductor and said resistor being connected to said first conductor;
   means for applying a fixed potential across said resistor; and
   means for making electrical connections to said taps and to said second conductor.

4. A device as defined by claim 3 wherein said first conductor is connected to said resistor at an intermediate point along the electrical length of said resistor.

5. A device as defined by claim 3 including a second thermocouple positioned within said chamber, said second thermocouple comprising two conductors, one of which is formed of the same metal as said first conductor and is connected to said first conductor, the other conductor of said second thermocouple being formed of a dissimilar metal and having means for making external electrical connection thereto.

6. A device for generating a plurality of constant reference potentials for calibration of iron-constantan and copper-constantan thermocouple potential measuring instruments comprising:
   an enclosed box for housing the component parts of said device, said box having an upper face upon which external electrical connecting terminals are located;
   a housing forming an enclosed chamber contained within said box:
   a first thermocouple comprising an iron condutcor and a constantan conductor located within said chamber, said iron conductor terminating at one of said external terminals;
   a second thermocouple comprising a copper conductor and a constantan conductor located within said chamber, said copper conductor terminating at another of said external terminals and said constantan conductor being connected to said constantan conductor of said first thermocouple to form a common contsantan conductor;
   a resistor positioned within said chamber and being provided with a plurality of taps at predetermined points along the electrical length of said resistor, each of said taps being individually connected to one of said external terminals, said resistor and taps being formed of constantan metal and said resistor having said common constantan conductor connected thereto; and
   means for aplying a fixed potential across said resistor.

References Cited
UNITED STATES PATENTS 2,093,745    9/1937    Westell _____ 219—209
2,876,417    3/1959    Winram _____ 73—1

LOUIS R. PRINCE, *Primary Examiner.*

S. C. SWISHER, *Assistant Examiner.*